United States Patent
Cassaing et al.

(10) Patent No.: US 8,351,738 B2
(45) Date of Patent: Jan. 8, 2013

(54) METHOD OF ESTIMATING AT LEAST ONE DEFORMATION OF THE WAVE FRONT OF AN OPTICAL SYSTEM OR OF AN OBJECT OBSERVED BY THE OPTICAL SYSTEM AND ASSOCIATED DEVICE

(75) Inventors: Frédéric Cassaing, Paris (FR); Isabelle Mocoeur, Fresnes (FR); Laurent Mugnier, Meudon (FR)

(73) Assignee: Office National d'Etudes et de Recherches Aerospatiales (Onera) (FR)

( * ) Notice: Subject to any disclaimer, the term of this patent is extended or adjusted under 35 U.S.C. 154(b) by 418 days.

(21) Appl. No.: 12/669,524

(22) PCT Filed: Jul. 21, 2008

(86) PCT No.: PCT/EP2008/059548
§ 371 (c)(1),
(2), (4) Date: Jan. 18, 2010

(87) PCT Pub. No.: WO2009/010593
PCT Pub. Date: Jan. 22, 2009

(65) Prior Publication Data
US 2010/0189377 A1    Jul. 29, 2010

(30) Foreign Application Priority Data
Jul. 19, 2007   (FR) ..................................... 07 56615

(51) Int. Cl.
*G06K 9/40* (2006.01)
*G06K 9/20* (2006.01)
*G02B 21/06* (2006.01)
*G01M 11/00* (2006.01)

(52) U.S. Cl. ...... 382/275; 382/312; 359/399; 356/124.5

(58) Field of Classification Search .................. 382/128, 382/275, 312, 276, 294; 250/201.3, 201.9; 359/399, 407; 356/124.5, 125, 126
See application file for complete search history.

(56) References Cited

U.S. PATENT DOCUMENTS 4,641,962 A * 2/1987 Sueda et al. .................. 356/124
(Continued)

OTHER PUBLICATIONS

International Search Report, PCT/EP2008/059548, dated Feb. 20, 2009.

*Primary Examiner* — Kanjibhai Patel
(74) *Attorney, Agent, or Firm* — Lerner, David, Littenberg, Krumholz & Mentlik, LLP (57) ABSTRACT

The invention relates to a method of estimating at least one deformation of the wave front of an observation system or of an object observed by said observation system, characterized in that: at least one diversity image is acquired, in the vicinity of the focal plane of the observation system, in at least one diversity plane, the diversity image comprising a known diversity deformation; and in that in each diversity plane, an image model is determined based on at least one decomposition of the physical pupil of the system into a plurality of subpupils; a decomposition over each subpupil of the sought-after deformation in the form of at least one known deformation weighted by coefficients to be determined; a determination of the transfer function of the system by autocorrelation of its pupil; the linearization of each of the terms of the autocorrelation as a function of the coefficients of the sought-after deformation, the linearization being performed in the vicinity of the known diversity deformation; the object observed and noise; and in that on the basis of the image model(s) determined and of the image(s) acquired, the sought-after deformation(s) or the observed object is (are) estimated.

11 Claims, 4 Drawing Sheets

U.S. PATENT DOCUMENTS

| | | | | |
|---|---|---|---|---|
| 5,412,200 | A * | 5/1995 | Rhoads | 250/201.9 |
| 5,471,346 | A * | 11/1995 | Ames | 359/731 |
| 5,610,707 | A * | 3/1997 | Duncan et al. | 356/121 |
| 5,905,591 | A * | 5/1999 | Duncan et al. | 359/399 |
| 6,426,834 | B1 * | 7/2002 | Braunecker et al. | 359/366 |
| 6,787,747 | B2 * | 9/2004 | Specht et al. | 250/201.3 |
| 7,319,783 | B2 * | 1/2008 | Dowski, Jr. et al. | 382/128 |
| 7,928,351 | B1 * | 4/2011 | Vasudevan et al. | 250/201.9 |
| 2004/0052426 | A1 | 3/2004 | Landesman | |

\* cited by examiner

METHOD OF ESTIMATING AT LEAST ONE DEFORMATION OF THE WAVE FRONT OF AN OPTICAL SYSTEM OR OF AN OBJECT OBSERVED BY THE OPTICAL SYSTEM AND ASSOCIATED DEVICE

CROSS REFERENCE TO RELATED APPLICATIONS

The present application is a national phase entry under 35 U.S.C. §371 of International Application No. PCT/EP2008/059548, filed Jul. 21, 2008, published in French, which claims the benefit of France Patent Application No.0756615, filed Jul. 19, 2007. The disclosures of said applications are incorporated by reference herein.

GENERAL TECHNICAL FIELD

The present invention relates to a method and to a device for estimating at least one deformation of the wave front of an optical system or of an object observed by the optical system.

The invention notably finds application in the field of high resolution imaging and in the shaping of beams.

The deformations may be introduced by an optical system and/or by the light propagation medium. Further, when the optical system is degraded by deformation, the invention allows estimation (restoration) of the observed object.

STATE OF THE ART

The quality of images obtained by an optical instrument is often degraded because of the presence of aberrations or other perturbations on the path of the wave from the observed object.

Indeed, these phase deformations present in the pupil of the instrument, attenuate the transfer function.

Several devices called Wave Surface Analyzers (WSA) have been developed for measuring the pupil phase by transforming it into measurable intensity variations.

Used in a system operating in a closed loop with a member which may control the phase of the received wave (deformable mirror, phase-shifters, etc.), these devices make it possible to get rid of the observed perturbations. Moreover, the information of the WSA may be used for restoring (estimating) the observed object.

Today, there exists a wide range of WSAs, reference may notably be made to G. Rousset, "*Wave-front sensors, Adaptive Optics in Astronomy*", under the supervision of F. Roddier, chap. 5, pp. 91-130, Cambridge University Press, Cambridge 1999.

In order to correct aberrations of an optical system with any pupil, i.e. either monolithic or consisting of a set of sub-pupils either joined or not, so-called focal plane techniques appear as attractive solutions.

Indeed, unlike the plane pupil devices which have to extract a portion of the light towards auxiliary optics (which complexifies the optical mounting), the focal plane methods allow measurement of deformations of the wave front as well as the combination of all the sub-pupils in a single frame, and this with a simple opto-mechanical design.

Since imaging instruments are naturally equipped with a camera in the focal plane, it is advantageous to use a WSA in the vicinity of this camera in order to measure the deformations of the optical instrument.

If the input pupil of the instruments is known, the so-called "Phase Retrieval" technique allows an estimation of the aberrations which are the most compatible with the known constraints in the pupil plane and in the focal plane, and this with the only datum of the focal image of a source point. However, this technique should be used for instruments having non-centro-symmetrical pupil configurations in order to estimate the deformations (or the "aberrant phase") without any sign ambiguity.

In the opposite case, or for an observation on an extended object, the only datum of the focal image is insufficient for uniquely finding the aberrations again.

In a general case (unknown object and/or any configuration), it is possible to lift the indetermination on the phase by using several so-called diversity images obtained in the vicinity of the focal plane in the presence of a perfectly known phase deformation (or modulation); the most often, this is one or even more defocused images for reasons of simplicity of application.

The estimation of the aberrant phase is then based on an approach which consists of selecting the aberrations which minimize a criterion of distance to the images.

A search for the deformations which produce an image model which is the closest to the data is therefore performed, the minimization generally being carried out in the Fourier plane.

This so-called phase diversity method is commonly applied to the phase measurement on the extended object.

However, with this method, it is possible to estimate the observed object. In other words, the observed object is restored by getting rid of the deformations.

However, whether this is for estimating the object or the aberrations, such a method requires significant computing times, which are hardly compatible with the requirements of a real-time estimation system.

Indeed, if N is the number of acquired images by diversity, 2N Fourier transforms are at least carried out at each iteration, being aware that about fifty iterations may be required in practice.

Several investigations have therefore been conducted in order to reduce the number of required iterations;
  first of all by attempting to find better minimization algorithms for simulation tests carried out monolithic configurations,
  and then by modifying the criterion used, with studies conducted for a monolithic or segmented telescope.

These methods require several iterations in order to converge and therefore have computing times which increase with the number of aberrations to be sought. The computing times for estimating the observed object are therefore also significant.

Measurement of small aberrations (i.e. residual aberrations) in a closed loop has sometimes been conducted but only for monolithic configurations (i.e. for the measurement of deformations of greater order than defocusing) and without any fine characterization of the performances of the sensor.

All these iterative methods therefore require significant computing powers.

Now the use of suitable processors, a priori not posing any problem for ground-based instruments, becomes critical for on-board applications where the power of the computer is limited.

PRESENTATION OF THE INVENTION

The invention aims at estimating deformations of a wave front of an observation system or of the object observed by the system, from one or more images taken in the vicinity of the focal plane of an observation system by means of a non-iterative but purely analytical method.

Thus, according to a first aspect, the invention relates to a method for estimating at least one deformation of the wave front of an observation system or of an object observed by the system.

In particular, the method of the invention is characterized in that: at least one diversity image is acquired in the vicinity of the focal plane of the observation system, in at least one diversity plane, the diversity image comprising a known diversity deformation; and in that in each diversity plane, an image model is determined based on at least: decomposition of physical pupil of the system into a plurality of sub-pupils; decomposition on each sub-pupil of the sought deformation in the form of at least one known deformation weighted by coefficients to be determined; determination of the transfer function of the system by autocorrelation of its pupil; linearization of each of the terms of the autocorrelation depending on the coefficients of the sought-after deformation, linearization being carried out in the vicinity of the known diversity deformation; the observed object and noise; and in that from the determined image model(s) and from the acquired image(s), and sought-after deformation(s) or the observed object are estimated.

The image model is further a function of the object observed by the system and of the linearized transfer function.

The method of the invention applies to an extended object and does not require any iteration therefore minimizing the computing time.

The method of the invention is based on the linearization of the transfer function of the observation system. With such a linearization it is possible to obtain an estimation of the deformations or of the observed object.

In particular, the transfer function of the observation system is linearized in each diversity plane and is at least one function of the sought deformation(s) and of the known diversity deformation associated with each diversity plane.

With the solutions as known, it is possible to estimate the deformations but with consequent computing times because in these solutions, the estimation is based on the minimization of the distance criterion, carried out iteratively. Further, with this solution, it is not possible to directly estimate the observed object in one iteration.

The fact of using an image model which depends on the transfer function of the linearized system in each diversity plane of the system allows simplification of the system of equations with two unknowns (the object and the perturbations) in order to resolve without any iteration either the object or the perturbations (the phase).

Preferably, the observation system is an optical observation system and the transfer function of the system is the optical transfer function, acoustic imaging.

Further, according to a second aspect, the invention relates to a device for estimating at least one deformation of the wave front of an observation system or of an object observed by the system.

The device of the invention is characterized in that it comprises means for acquiring, in the vicinity of the focal plane of the observation system, at least one diversity image in at least diversity plane, the diversity image comprising a known diversity deformation; and in that in each diversity plane, the device comprises: means for determining an image model based on at least: decomposition of the physical pupil of the system into a plurality of sub-pupils; decomposition on each sub-pupil of the sought-after deformation in the form of at least one known deformation weighted by coefficients to be determined; determination of the transfer function of the system by autocorrelation of its pupil; linearization of each of the terms of the autocorrelation as a function of the coefficients of the sought deformation; the linearization being carried out in the vicinity of the known diversity deformation; the observed object and noise; and in that from the determined image model(s), and from the acquired image(s), the sought deformation(s) or the observed object are estimated.

Because the device is suitable for applying a method which does not require any iteration, it complies with strong real time constraints and is perfectly integrated into on-board systems.

The device of the invention may be used in a closed loop in conjunction with correction means, for real time correction of the deformations of the wave front of an optical system and/or for further estimating the object observed by the observation system.

Finally, the invention, according to a third aspect, relates to an on-board system comprising means for applying the method according to the first aspect of the invention.

PRESENTATION OF THE FIGURES

Other features and advantages of the invention will further become apparent from the following description which is purely illustrative and non-limiting and should be read with reference to the appended drawings wherein.

DESCRIPTION OF ONE OR MORE
EMBODIMENTS AND APPLICATION

Figure 1:
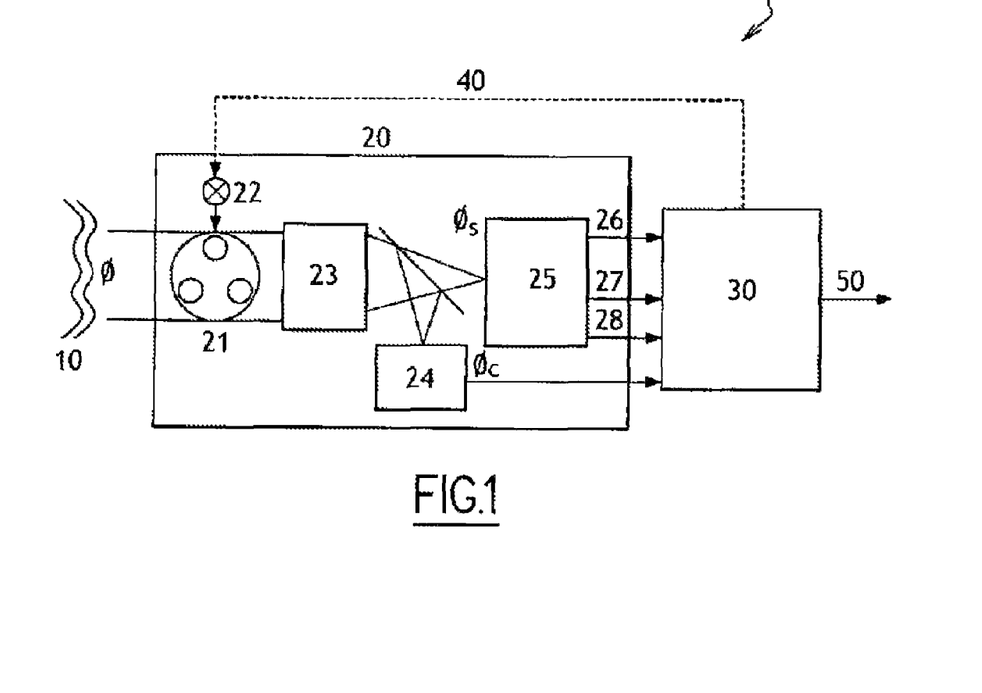
FIG. 1 illustrates a device for estimating deformations of the wave front according to the invention.

FIG. 1 illustrates a device for estimating the deformations of the wave front of an optical system or of an object observed by an optical system.

The incident and/or positioning deformations 10 of an optical system 20 (illustrated here as an example of such an optical imaging instrument) are estimated by an analytical method implemented in computation means 30 of the device 1.

The thereby estimated aberrations 40 may then possibly be redirected towards the optical system 20 in order to be corrected.

The analytical method also allows restoration of the object 50.

Let us note that the observation instrument may be monolithic or with a segmented pupil 21.

In the segmented pupil case, the device may be downstream from a system for recombining beams 23.

A sensor 25, installed here in the vicinity of an imaging sensor 24, generates at least one diversity image 26 under perfectly known phase conditions.

It is noted that if the object is unknown, several diversity images 27, 28 are required.

A diversity image is an image in which a known diversity deformation is added.

Because of the aberrations present on the optical path of the light, the aberrant phase on the imaging sensor, noted as $\phi_c$, may be different from the one seemed by the sensor, noted as $\phi_s$.

As the observed object may be arbitrary, the measurement method does not require the introduction of reference source; the images therefore directly stem from the observed object.

They are acquired by means of one or more sensors, for example consisting of CCD or CMOS type matrices, preferably with Shannon sampling.

It should be noted that from an observed object, it is possible:
- to acquire an image from which one or more known deformations will be added in order to obtain diversity images,
- to simultaneously acquire (if possible or in the worst case during a sufficiently short time) as much diversity image as desired.

The measurement of the aberrations of the wave front is based on the use of the acquired images which contain the aberrant phase $\phi_s$ as well as the diversity deformations.

The thereby estimated aberrations 40 may then possibly be corrected by correction means 22, for example a deformable mirror.

During the method, the acquired images are modeled according to the sought-after deformations, to the object, as well as to the whole of the relevant physical parameters such as the introduced phase modulation and the optical detection characteristics of the optical system.

Subsequently, we shall place ourselves in a diversity plane noted as d while introducing a perfectly known phase $\phi_d$ and we shall consider deformations producing a phase $\phi_a$ ($\phi_{dn}$ and $\phi_{an}$ on each sub-pupil respectively).

By diversity plane d, is meant the location where a diversity image is acquired.

Therefore, this is a focal image in the presence of a possible known additional aberration, such as for example defocusing. A diversity plane may in this case be an extra-focal plane, the known diversity deformation is then in this case defocusing.

However, the diversity deformation may be arbitrary.

Figure 2:
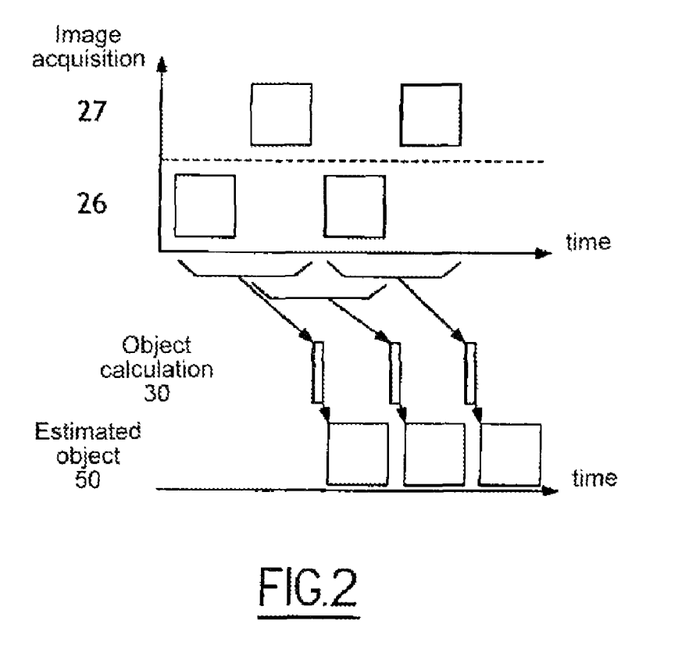
FIG. 2 illustrates an alternative of the device of the invention for estimating the observed object.

FIG. 2 illustrates an embodiment for estimating the observed object.

At least two diversity images are generated 25, either on separate sensors, or on the same sensor. In the latter case, acquisition of the images may be accomplished sequentially. FIG. 2 illustrates a time diagram of the acquisition of the images in a sequential way. To do this, block 25 involves in the optical train any system allowing introduction of a diversity deformation. Such a system may be a membrane, a bimorph mirror, an electro-optical system, etc.

The method for estimating the observed object is applied by means of a dedicated printed circuit which takes into account the parameters of the optical system (shape of the pupil, observation wave length, etc.) and which allows an estimation of the observed object 50 over all the frames of two images (see FIG. 2).

Figure 3:
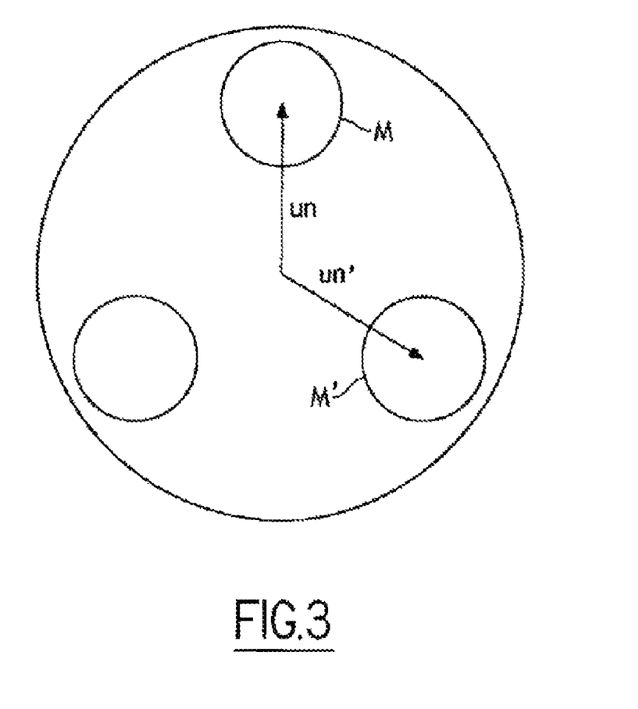
FIG. 3 illustrates a configuration with three sub-pupils.

FIG. 3 illustrates a configuration with $N_T$=3 sub-pupils.

Let p the transmission of the pupil configuration, consisting of $N_T$ sub-pupils placed at position $U_n$ and each having a phase noted as $\phi_n$.

The pupil transmission is given by:

$$p_d = \sum_{n=1}^{N_T} \Pi \exp j(\phi_{dn} + \phi_{an}) * \delta_{u_n} \quad (1)$$

with $j^2 = -1$.

It is noted that the decomposition mentioned above (cf. equation (1)) is also carried out even if the instrument includes only one single pupil.

If the aberrant phase is zero, transmission of the pupil is perfect and has the value 1.

It should be noted that the shape of the pupil or of the sub-pupils may be of any shape, for example circular, hexagonal or square, etc.

The aberrant phases may be expressed in different bases of known deformations, for example the base of Zernike polynomials:

$$\varphi_{an}(r) = \sum_{k=1}^{N_Z} a_{kn} Z_k(r) \quad (2)$$

with $a_{kn}$ designating the aberrations of order k on the sub-pupil n, $N_z$, the number of relevant polynomials (i.e. the number of sought coefficients).

Equations (1) and (2) allow decomposition of the pupil and of the phase in a base known beforehand. There then remains to search for the coefficient $a_{kn}$ of this dual decomposition.

Subsequently, the vector of size $N_a \times 1$ for which the elements $a_{kn}$ are the sought aberrations will be noted as a, $N_a$ being the number of sought unknowns equal to $N_T \times N_Z$. For example, for an instrument with six sub-pupils ($N_T$=6) on which the first three Zernike orders ($N_Z$=3) will be sought, $N_a$=18.

In the frequency plane, the optical transfer function $F_d$ obtained at the $d^{th}$ diversity plane is given by the autocorrelation of the pupil:

$$(p \otimes p)_d = F_d = \sum_{n=1}^{N_T} \sum_{n'=1}^{N_T} F_{d,n,n'} \Psi(a_{kn}, a_{kn'}, d) * \delta_{u_n - u_{n'}} \quad (3)$$

It should be noted that if $N_T$ is the number of sub-pupils, the optical transfer function has a central peak, the sum of $N_T$ individual peaks plus $N_T(N_T-1)$ satellite peaks. Further, it should be noted that it is also possible to break down a pupil into a plurality of sub-pupils.

Figure 4A:
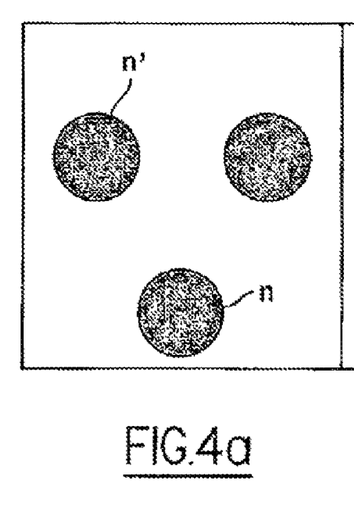
FIGS. 4a and 4b respectively illustrate one configuration with three sub-pupils of an optical system and the transfer functions associated with zero aberrations.
Figure 4B:
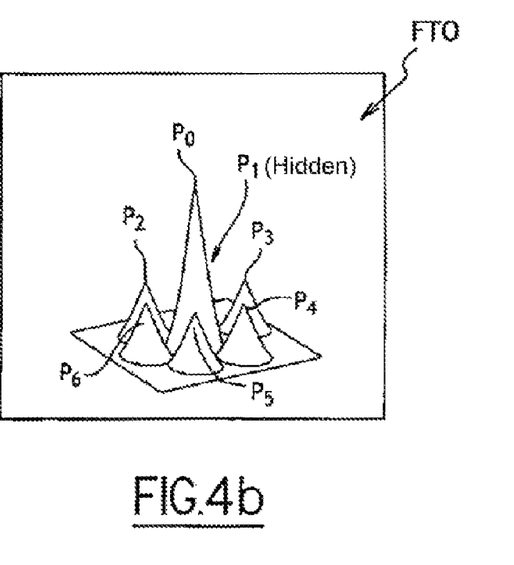

Each peak $P_0, P_1, \ldots, P_6$, in the case when $N_T$=3, of the optical transfer function as illustrated by FIG. 4b (peak $P_1$, which is a satellite peak, is hidden by the central peak $P_0$), results from the intercorrelation of the pupil n with the pupil n' and is the product of two functions:
- a function $F_{d,n,n'}$ only containing the diversity aberrations d ($F_{d,n,n'}$ therefore represents the non-aberrant intercorrelation peak),
- a function $\Psi$ depending on the sought aberrations and on diversity.

If the phase on the sensor $\phi_s$ is small, it is possible to write each peak of the optical transfer function as:

$$F_d = \sum_{n=1}^{N_T} \sum_{n'=1}^{N_T} F_{d,n,n'} [1 + \Psi_a(a_{kn}, a_{kn'}, d)] * \delta_{u_n - u_{n'}} \quad (4)$$

with $$\Psi_a = \Psi - 1$$

which may be linearized relative to a vector x depending on the aberrations. This linearization may be carried out according to two cases.

Case No. 1

If pistons and higher modes are sought, the expression of $\Psi_A$ may be developed to the first order in the vicinity of the diversity aberrations in the following way:

$$F_d \approx \sum_{n=1}^{N_T} \sum_{n'=1}^{N_T} F_{d,n,n'} * \delta_{u_n - u_{n'}} + \left[ \sum_{n=1}^{N_T} \sum_{n'=1}^{N_T} F_{d,n,n'} \Psi_a(d) * \delta_{u_n - u_{n'}} \right] \cdot x \quad (5)$$

with $$x = a$$

wherein "●" designates a matrix product.

Case No. 2

If only the pistons are applied/sought, then the expression of the optical transfer function in each diversity plane is exact and has the expression:

$$F_d = \left[ \sum_{n=1}^{N_T} \sum_{n'=1}^{N_T} F_{d,n,n'} * \delta_{u_n - u_{n'}} \right] \cdot x \text{ with } x = \exp(j\alpha) \quad (6)$$

$\alpha$ being a set of linear combinations of $a_{kn}$ and $a_{kn'}$.

There is therefore a direct link between the shape of the optical transfer function and the deformations which are sought.

Once the vector x is determined by the method described above and taking into account both cases as explained above, the aberrations are inferred from x by equations (5) and (6).

The Fourier transform of the image obtained on the $d^{th}$ diversity plane is given by:

$$\tilde{i}_d = \tilde{o} F_d + b_d \quad (7)$$

with ~beings the Fourier transform operator, õ represents the spectrum of the object in the frequency plane and $b_d$ is the noise inherent to the acquisition of the image $i_d$.

The measuring principle is based on the fact that the deformations and/or the object producing a model as close as possible to the acquired images will be sought after, which amounts to minimizing a criterion of distance J between the reconstructed model and the data obtained in each plane. The criterion is for example quadratic.

In the Fourier domain, this criterion is written as:

$$J(a, o) = \sum_{\nu=1}^{N_f} \sum_{d=1}^{N_d} |\tilde{i}_d(\nu) - F_d(a, \nu) \tilde{o}(\nu)|^2 \quad (8)$$

Wherein $N_d$ is the number of diversity planes, $N_f$ the number of frequencies on which the optical transfer function is defined, $i_d$ is the image acquired on the $d^{th}$ plane and $F_d(a,\nu) \tilde{o}(\nu)$ is the image model in the frequency domain.

Although the object is generally unknown, it is possible to express it with a fixed aberrant phase and therefore to get rid of the latter. Indeed, equation (8) is non-linear in phase but quadratic in object. Thus with a fixed phase, there is an analytical solution for the object which is given by:

$$\tilde{o}(a, \nu) = \frac{\sum_{d=1}^{N_d} F_d^*(a, \nu) \tilde{i}_d(\nu) + \sigma^2 \frac{\tilde{o}_m(\nu)}{S_0(\nu)}}{\sum_{d=1}^{N_d} |F_d(a, \nu)|^2 + \beta \frac{\sigma^2}{S_0(\nu)}} \quad (9)$$

wherein $F_d^*$ represents the conjugate of $F_d$;

$$\frac{\tilde{o}_m(\nu)}{S_0(\nu)} \text{ and } \beta \frac{\sigma^2}{S_0(\nu)}$$

are terms related to possible regularization on the object (if there is no regularization, these terms are equal to zero); further $$\beta \frac{\sigma^2}{S_0(\nu)}$$

is the ratio of the spectral power densities of the noise ($\sigma^2$) and of the object ($S_0(\nu)$) weighted by a coefficient $\beta$ (by default $\beta=1$) and $\tilde{o}_m$ represents the average object.

From Equation (8) it is possible to obtain a new criterion J' which explicitly only depends on the sought deformations.

$$J'(a) \propto \sum_{\nu=1}^{N_f} \frac{\left| \sum_{d=1}^{N_d} \sum_{d'=1}^{d-1} \tilde{i}_d(\nu) F_{d'}(a, \nu) - \tilde{i}_{d'}(\nu) F_d(a, \nu) \right|^2}{\sum_{d=1}^{N_d} |F_d(a, \nu)|^2 + \beta \frac{\sigma^2}{S_0(\nu)}} + Reg(\tilde{o}_m) \quad (10)$$

with Re g($\tilde{o}_m$)a regularization term depending on the average object.

Generally, the minimization of the criterion J' is carried out iteratively with significant computation times.

As a replacement for the iterative algorithm, the measuring method uses an analytical algorithm developed under the assumption of small phases $\phi_s$ on WSA.

In particular, this algorithm is used around an operating point, i.e. around $\phi_s$-$\phi_c$, or for example with a small aberrant phase $\phi$ (operating point close to zero).

Thus, within the scope of the low $\phi_s$ assumption, it is possible to:

develop the denominator of the criterion J' to the zeroth order, which amounts to considering it as a weighting term independent of the sought deformations, express the image formation model as a simple function of the aberrations, which amounts to linearizing in each plane the peaks of the optical transfer function in the vicinity of the fixed diversity aberrations, in other words, this amounts to linearizing the optical transfer function given by equation (3).

Unlike the known techniques, by linearization of each peak, it is possible to take into account compact and redundant configurations (including optical transfer function peaks which overlap each other).

This linearized criterion may be expressed as:

$$J''(a) = \sum_{v=1}^{N_f} \|A \cdot x - B\|^2 \tag{11}$$

Let $N_i$ be the number of pixels in the image, typically 128×128 or 256×256.

The digitized transfer function, i.e. defined in a space compatible with that of the recorded image, therefore pixelized, is defined on $N_f$ frequencies, with $N_f \leq N_i$. The matrix A is therefore of size $N_f \times N_a$ and B is of size $N_f \times 1$.

As this new criterion is quadratic, the deformations of the wave front may be simply expressed as:

$$\bar{x} = [\Re\{A''A\}]^{-1} \Re\{A''B\}, \tag{12}$$

wherein $\Re$ designates the real part operator.

The sought aberrations are then inferred from x.

In order to refine the criterion, it is also possible:

- to take into account the different weights between the images;
- to introduce filtering on the images;
- to include handling of effects for extended images;
- to include a search for differential tilt jitters between the diversity images;
- to add regularization terms.

Any "refining" carried out is expressed by a modification of the matrices A and B which will be involved, but the basic principle of the measuring method is unchanged.

We have seen above that from the criterion it is possible to find the aberrations; indeed, we have got rid of the object in equation (9) by expressing it with a fixed aberrant phase and by re-injecting it into the initial criterion given by equation (8).

EXAMPLE 1

If the pistons and other aberrations are sought, we have shown in case no. 1, shown earlier, that it was possible to develop the optical transfer function to the first order in x=a, thus let us set:

$$F_d \approx L_d + M_d \text{ with } L_d = \sum_{n=1}^{N_T}\sum_{n'=1}^{N_T} \Psi_{d,n,n'}\Psi_a(d) * \delta_{u_n - u_{n'}} \tag{13}$$

and $$M_d = \sum_{n=1}^{N_T}\sum_{n'=1}^{N_T} \Psi_{d,n,n'}\delta_{u_n - u_{n'}}$$

with $L_d$ the linear x portion and $M_d$ the fixed portion.

The expression of matrices A and B is then:

$$A = \sum_{d=1}^{N_d}\sum_{d'=1}^{d-1} A_{dd'} - A_{d'd} \tag{14}$$

$$B = \sum_{d=1}^{N_d}\sum_{d'=1}^{d-1} B_{dd'} - B_{d'd}$$

with $$A_{dd'} = \frac{\tilde{i}_d L_{d'}}{\left[\sum_{d=1}^{N_d}|M_d(0)|^2\right]^{1/2}} \tag{15}$$

and $$B_{dd'} = \frac{\tilde{i}_d M_{d'}}{\left[\sum_{d=1}^{N_d}|M_d(0)|^2\right]^{1/2}} \tag{16}$$

With equation (12), the computation cost is much lower than in the iterative case.

Indeed, inversion of matrix $A^H A$ is not dimensioning since it is of size $N_a \times N_a$ and that $N_a \ll N_f$; the computing time is then reduced to the time required for carrying out the $N_d$ Fourier transforms.

Figure 5:
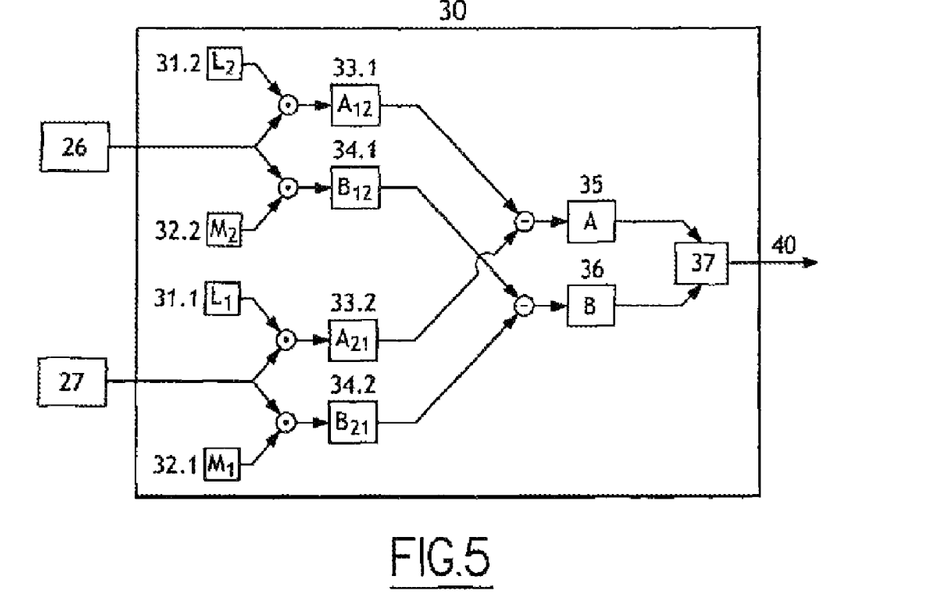
FIG. 5 illustrates a first embodiment of the method of the invention for estimating deformations.

FIG. 5 illustrates the estimator 30 (as noted in FIG. 1). We detail therein, for a non-limiting case with two diversity images noted as 26 and 27, an embodiment, the one with which pistons and superior modes may be estimated (first order development as a function of a, accordingly).

The method for estimating aberrations carries out in each diversity plane:

calculation of the matrices $L_1$, $L_2$ 31 and $M_1$, $M_2$ 32,
$L_1$ and $L_2$ are then multiplied with the Fourier transform of images 27 and 26,
the symbol ⊙ designating a linear operation, such as the term-to-term product or a succession of linear operations,
the same type of operation is carried out with $M_1$ and $M_2$. Thus at the output, the matrices $A_{12}$, $A_{31}$, 33 of size $N_f \times N_a$ are obtained as well as the matrices $B_{12}$, $B_{21}$ 34 of size $N_f \times 1$,
according to equation 10, the resulting matrices are then subtracted in order to form the matrices A35 and B36,
operation 37 calculates the term $[\Re\{A''A\}]^{-1}\Re\{A''B\}$ according to equation 11,
as within the scope of this embodiment a=x, the sought aberrations are directly obtained at the output of operator 37.

EXAMPLE 2

The process for estimating aberrations described above may also be considered in another way.

Indeed, starting with the expression of the estimated aberrations (see equation 12), it is possible to analytically express certain terms.

In particular, the aberrations may be found by applying a reconstructor R to an error signal from the diversity images; R is then predefined and calculated once and for all for the whole of the physical parameters defined in the system; it should be noted that in this case, the object initially taken into account is an average object, requiring a priori knowledge on the scenes which will be observed.

However it is noted that within the scope of a use in a closed loop, this object may be adjusted gradually as the loop stabilizes.

In this case, equation (12) may be simplified. The deformations of the wave front are then expressed as $$\hat{x} = R \cdot I \tag{17}$$

Wherein $I=[\tilde{i}_1, \tilde{i}_2, \ldots, \tilde{i}_d]$ designates a concatenation of matrices, I therefore is of size $N_a N_f$, the elements of which $\tilde{i}_d$ are the Fourier transforms of the diversity images, R is the reconstructor of size $N_a \times N_f N_d$.

Figure 6:
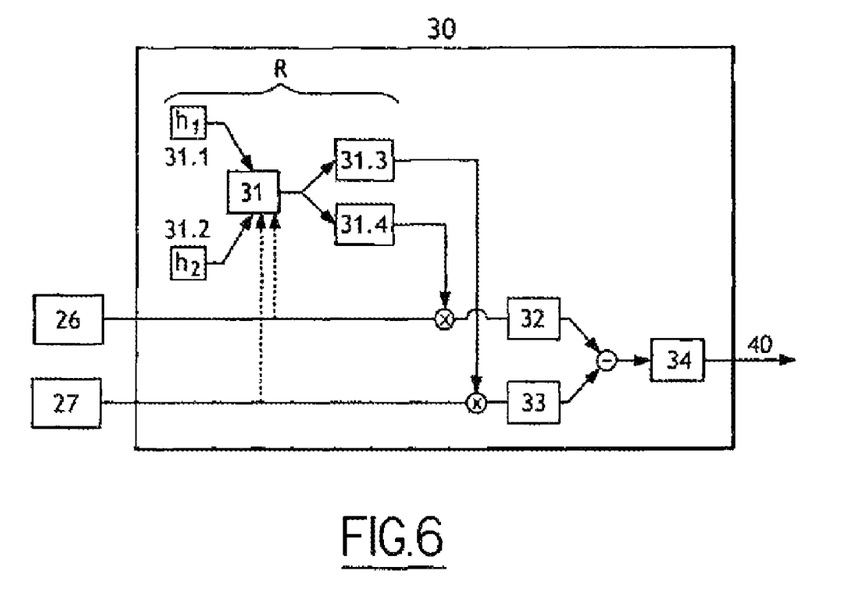
FIG. 6 illustrates a second embodiment of the method of the invention for estimating deformations.

The corresponding estimation method illustrated in FIG. 6 in a non-limiting framework with two images, occurs in two phases.

In a first phase, the reconstructor is determined beforehand: the models which will be associated with the image, of size $N_a \times N_f$, are calculated under the assumption of small phases $\phi_s$ on the WSA by combination 31 of the transfer functions 31.1 and 32.2 obtained in both diversity planes. Two matrices 31.3 and 31.4 are then obtained.

In a second phase, the sub-reconstructor 31.3 is matrix-multiplied with the Fourier transform of the image 27; the same operation is carried out between matrix 31.4 and image 26.

Both resulting matrices 32 and 33 are then subtracted so as to obtain the x function, which will be used for inferring the sought aberrations 40 at 34.

Subsequently, the images may also be used for adjusting the object used in the reconstructor (whence the dotted lines illustrated in FIG. 6).

We have described above the use of the linearization of the optical transfer function peaks for searching for aberrations, once the latter function is determined, they may be used for going back to the object, notably when the latter is unknown.

EXAMPLE 3

By using the expression of the object expressed by equation (9) as a function of the aberrations, it is possible once the aberrations are estimated, to re-inject them into the expression in order to find the object.

Of course, it is possible to refine the search for the object by a possible filtering operation, handling of the edge effect, etc.

Figure 7:
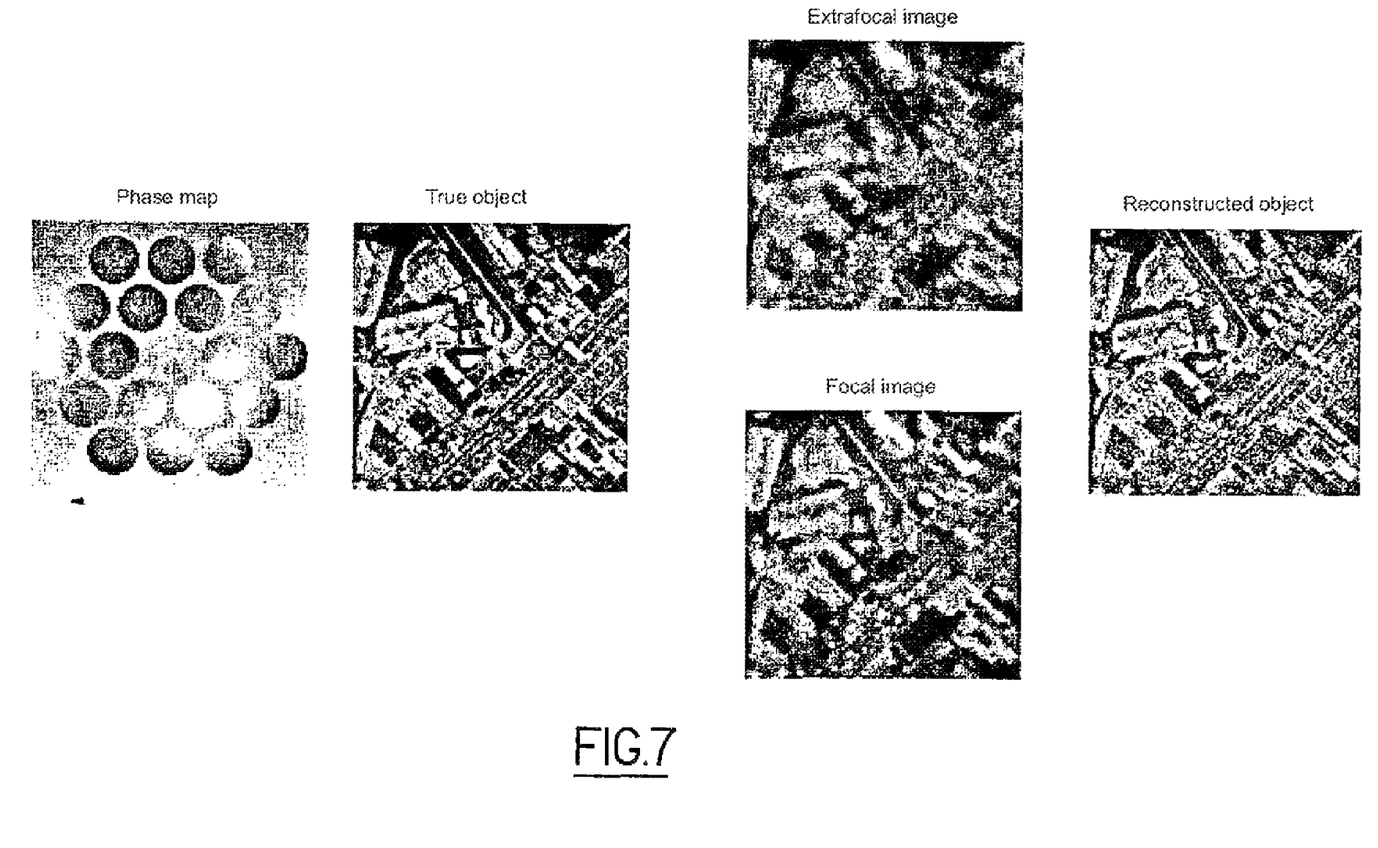
FIG. 7 illustrates the estimation of the object observed for a configuration with 18 sub-pupils as an approximation of a monolithic telescope.

FIG. 7 illustrates the estimation of the object observed by an optical system consisting of eighteen sub-pupils. Each pupil (consisting of sub-pupils) is very close to that of a monolithic telescope, which shows that the present device may be applied to such a telescope with hexagonal sub-pupils for example.

A case is illustrated where the observation instrument is affected by a phase perturbation equal to $\lambda/10$, resulting from drawing out at random eight Zernike modes (defocusing, two astigmatisms, two comas, two triple comas, spherical aberration).

Two images are simulated from this phase assumption on the instrument and from a reference object: an image in the focal plane and an image in a plane defocused by 1 rad rms, with a good signal-to-noise ratio.

From these two images, the phase perturbation is exclusively estimated on the sub-pupils (in piston-tip-tilt exclusively).

The object is then reconstructed by deconvolution of the image measured in the focal plane, by using the estimated phase.

FIG. 7 shows that the object thereby estimated by simple digital processing is very close to the observed object, in particular the details (cars on the car park for example) are much sharper than on the focal image without any processing.

The invention claimed is:

1. A method for estimating at least one sought deformation of the wave front of an observation system or of an object observed by said observation system, comprising:
   acquiring, in the vicinity of the focal plane of the observation system, at least one diversity image in at least one diversity plane, the diversity image comprising a known diversity deformation; and
   in each diversity plane:
   determining an image model according to at least the following steps:
      decomposition of a physical pupil of the observation system into a plurality of sub-pupils;
      decomposition on each sub-pupil of the sought deformation in the form of linear combination polynomials of at least one known deformation weighted by sought deformation coefficients;
      determination of a transfer function of the observation system by autocorrelation of its pupil;
      linearization of each of the terms of the autocorrelation depending on the sought deformation coefficients, the linearization being carried out relative to a vector based on the sought deformation;
      determination of a criterion of distance between the image model and data obtained in each diversity plane, the criterion of distance being quadratic in the image model, the image model being linear in the sought deformation; and
      analytical minimization of the criterion of distance for estimating at least one of the sought deformation and the object as close as possible to the data obtained in each diversity plane, a difference between the data obtained and the image model being noise,
   said analytical minimization comprising:
      obtaining from the criterion of distance for a known deformation, an analytical solution of the object;
      injecting the obtained object into the criterion of distance to obtain a new criterion which only depends on the sought deformation; and
      minimizing the new criterion to obtain the sought deformation.

2. The method according to claim 1, wherein at least one of the sought deformation and the obtained object minimize a quadratic estimation criterion.

3. The method according to claim 1, wherein the sub-pupils are circular or hexagonal or square.

4. The method according to claim 1, wherein the sought deformation is expressed in the Zernike base.

5. The method according to claim 1, wherein the diversity deformation is arbitrary.

6. The method according to claim 1, wherein the sought deformation is:
   a piston, in the event that the linearization of the transfer function in each diversity plane is exact; or
   a piston and higher modes, in the event that the linearization of the transfer function in each diversity plane is a development to a first order in a vicinity of the diversity deformation.

7. The method according to claim 1, wherein the method is applied on one or more integrated circuits.

8. The method according to claim 1, wherein the observation system is selected from the group consisting of: optical observation system, electron microscope, gamma ray telescope, acoustic imaging.

9. A device for estimating at least one sought deformation of a wave front of an observation system or of an object observed by the observation system, comprising:
- means for acquiring, in a vicinity of a focal plane of the observation system, at least one diversity image in at least one diversity plane, the diversity image comprising a known diversity deformation;
- means for determining an image model according to the following steps:
  - decomposition of a physical pupil of the system into a plurality of sub-pupils;
  - decomposition on each sub-pupil of the sought deformation in the form of a linear combination of polynomials of at least one known deformation weighted by sought deformation coefficients;
  - determination of a criterion of distance between the image model and data obtained in each diversity plane, the criterion of distance being quadratic in the image model, the image model being linear in the sought deformation;
  - analytical minimization of the criterion of distance for estimating at least one of the sought deformation and the object as close as possible to the data obtained in each diversity plane, a difference between the data obtained and the image model being noise, the analytical minimization comprising:
    - obtaining from the criterion of distance for a known deformation, an analytical solution of the object;
    - injecting the obtained object into the criterion of distance to obtain a new criterion which only depends on the sought deformation;
    - minimizing the new criterion to obtain the sought deformation.

10. The device according to claim 9, further comprising means for sending the obtained sought deformation to correction means of the observation system.

11. The device according to claims 9, further comprising means for sequentially acquiring the diversity image.

* * * * *